United States Patent [19]

Grigoli

[11] Patent Number: 5,958,493
[45] Date of Patent: Sep. 28, 1999

[54] METHOD AND APPARATUS FOR PRODUCING ICE CREAM

[75] Inventor: Franco Albino Luigi Grigoli, Milan, Italy

[73] Assignee: Stampi Industria Dolciaria Affini Milano S.R.L., Milan, Italy

[21] Appl. No.: 08/866,638

[22] Filed: May 30, 1997

[30] Foreign Application Priority Data

Nov. 29, 1996 [IT] Italy .................................. MI96A2496

[51] Int. Cl.⁶ ..................................................... A23G 9/04
[52] U.S. Cl. ........................... 426/421; 426/100; 426/101; 426/134; 426/565; 426/512; 426/516; 426/518; 426/524; 99/455
[58] Field of Search ..................................... 426/100, 101, 426/134, 249, 565, 421, 512, 516, 517, 518, 524; 99/455; 425/126.1, 126.2; 62/345

[56] References Cited

U.S. PATENT DOCUMENTS

| | | | |
|---|---|---|---|
| 4,413,461 | 11/1983 | Waldstrom | 426/421 X |
| 4,507,326 | 3/1985 | Tarantino | 426/565 X |
| 4,546,615 | 10/1985 | Gram | 426/421 X |
| 4,648,829 | 3/1987 | Cattani | 426/421 X |
| 4,746,523 | 5/1988 | Binley | 426/134 X |
| 4,986,080 | 1/1991 | Grigoli et al. | 62/345 X |
| 5,085,059 | 2/1992 | Grigoli et al. | 62/345 |
| 5,343,710 | 9/1994 | Cathenaut et al. | 426/421 X |
| 5,516,540 | 5/1996 | Cathenaut | 426/421 X |

*Primary Examiner*—Milton Cano
*Attorney, Agent, or Firm*—Notaro & Michalos P.C.

[57] ABSTRACT

A method and apparatus for producing ice cream with a stick, where the stick is inserted into the ice cream as the ice cream is extruded and where devices are provided to move the ice cream product, grasped by the stick, without the ice cream product itself coming in contact with any part of the apparatus. In the method, the ice cream is cooled to a temperature to reach a density sufficient to allow the ice cream to be supported by the stick. The product is extruded through an extrusion press, and the stick is inserted into the ice cream product coming out from the extrusion press while the ice cream product is cut. The ice cream product is the inserted, held by the stick, into a conveyor device that moves the ice cream product within a cooling tunnel until the ice cream product reaches a final temperature and as the ice cream product emerges from the tunnel, the product is completed with coverings, if required, and then packaged.

11 Claims, 7 Drawing Sheets

METHOD AND APPARATUS FOR PRODUCING ICE CREAM

FIELD AND BACKGROUND OF THE INVENTION

This invention proposes an apparatus and related method for the production of ice creams with stick, where the stick is inserted into the product when it is extruded and where devices are provided that can move the product, grasping only the stick. without the product itself getting in touch with any part of the plant.

According to the invention also a method is provided, where:

the product is cooled to such a temperature that lets it achieve a density sufficient to allow it to be supported by means of a stick;

the product is extruded;

as the product comes out from the extrusion press, the stick is inserted into the product and at the same time the product is cut;

holding the product by means of the stick, the product is inserted into a conveyor device that moves it within a cooling tunnel until it reaches the final temperature and when coming out from this latter step;

the product is completed with coatings, if necessary, and then is sent to a packaging operation.

According to the preferred embodiment of the invention, the freezing chamber is of the liquid nitrogen type and the conveyor is formed by a plurality of pliers that grasp the stick with the product and that are fitted on a chain that moves along a course located on a substantially horizontal plane. The apparatus according to the invention has compact dimensions, low costs and has management costs that are lower than those of the apparatuses used today.

With known methods and apparatuses for ice cream production through extrusion of ice creams with sticks, the product is cooled to a temperature of about −5° C.−−6° C. so as to let it reach a certain density, it is extruded, cut and then placed on trays or the like to be brought to a freezing chamber where the product, within 18–20 minutes is cooled in an air current until it reaches the required temperature and density. These apparatuses are expensive, however cumbersome and imply high management and maintenance costs. The tray devices for the conveyance of the product are complex manufactures and more over they need to be washed and sterilized at the end of each work cycle.

This implies waste of a noticeable quantity of water and detergents and the need to treat these washing waters before draining; all this, means a noticeable waste of energy and material with consequent costs. Also the freezing chamber, generally with freon cooling or analogous system, is cumbersome and expensive.

Since the dimensions of the machine are proportional to the period of time the products must be inside before they reach the necessary temperature, it is clear that an appartus with high productivity needs a freezing chamber with substantial dimensions, suitable to allow a presence of the products inside it for a period of time that varies, as above mentioned, between 18 and 20 minutes.

The inconveniences of today's apparatuses and methods can be summarized as follows:

trays or other conveyance devices are needed on which the product must be placed to be cooled until it reaches sufficient density;

costs from the consumption of detergents and water for the washing of the parts of the apparatus that touch the product and costs for the following treatment of the water used before draining;

cost of the apparatus and costs for maintenance personnel;

energy costs to create and maintain cold conditions in the freezing chamber;

use of cooling gases that are noxious to the environment, such as CFC, ammonia etc.; and substantial dimensions of the plant itself.

SUMMARY OF THE INVENTION

These inconveniences are eliminated with the apparatus and the method according to the invention, where the extrusion of the product is provided when it reaches a density sufficient to allow the insertion of a stick and the handling of the product only by grasping the stick. It is then possible to eliminate the tray conveyance device, avoiding related costs and space needs.

In addition, washing operations are eliminated, avoiding in this way the expenses for detergents, water and their treatment.

The products with the sticks inserted, pass directly from the extrusion press to a cooling chamber of the liquid nitrogen type, moving them along a closed path that is located on a substantially horizontal plane, with a noticeable reduction of the spaces occupied as well.

BRIEF DESCRIPTION OF THE INVENTION

These and other characteristics shall appear better from the following detailed description, provided as an example not imitative, with reference to the enclosed figures, where:

FIGS. 1–6 are schematic side views of a device for the extrusion and cutting of the product during the various steps of the production cycle; and FIG. 7 is a schematic view, in elevation, of the apparatus according to the invention.

DESCRIPTION OF THE PREFERRED EMBODIMENT

Figure 6:
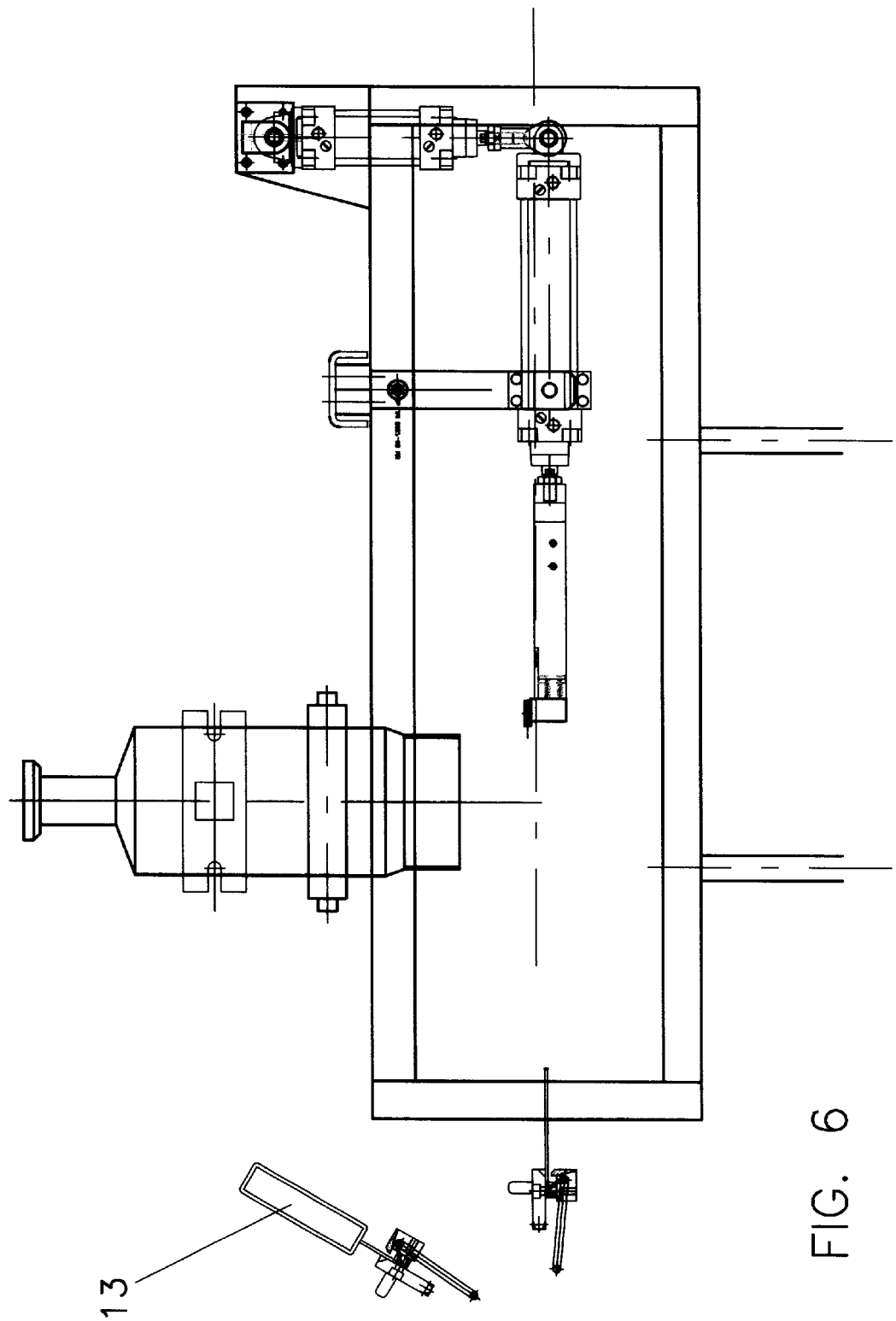
Figure 7:
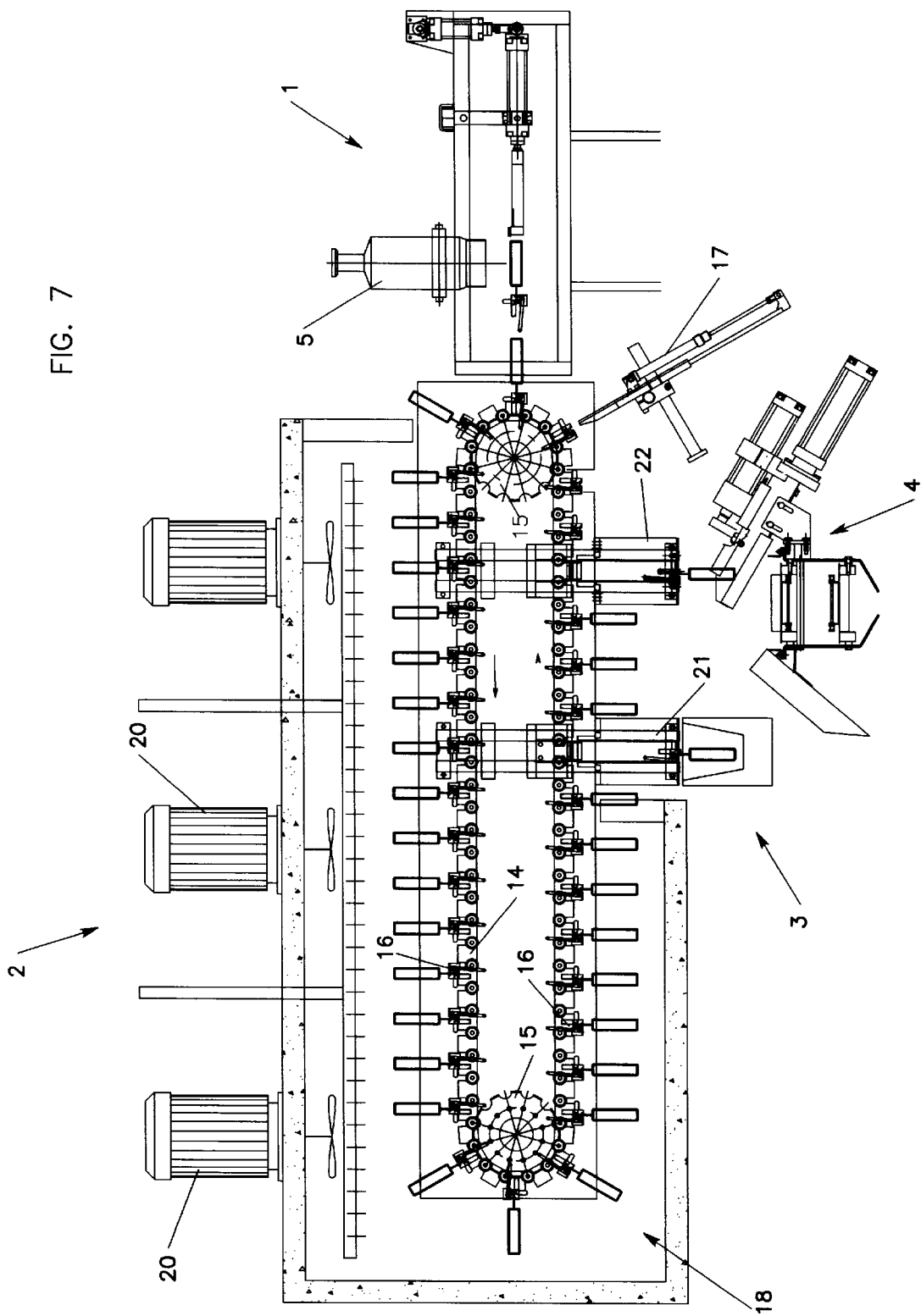

With reference to FIG. 7, the plant according to the invention includes a unit for extrusion, cutting and sticking, generally designated 1, a cooling unit, shown at 2, one or more units 3, where the product is coated, and a collecting and packaging unit 4. In unit 1 an extrusion press 5 of a known type is located, where the product, cooled to a temperature sufficient to let it reach a certain density, for instance a temperature of about −9° C.−−10° C., is extruded in bars having the dimensions of the finished product. The extrusion press is fitted on a mobile support that lets it move forward and backward for a certain stroke, in order to allow the cutting and the removing of the product according to the sequence shown in FIGS. 1–6.

Figure 4:
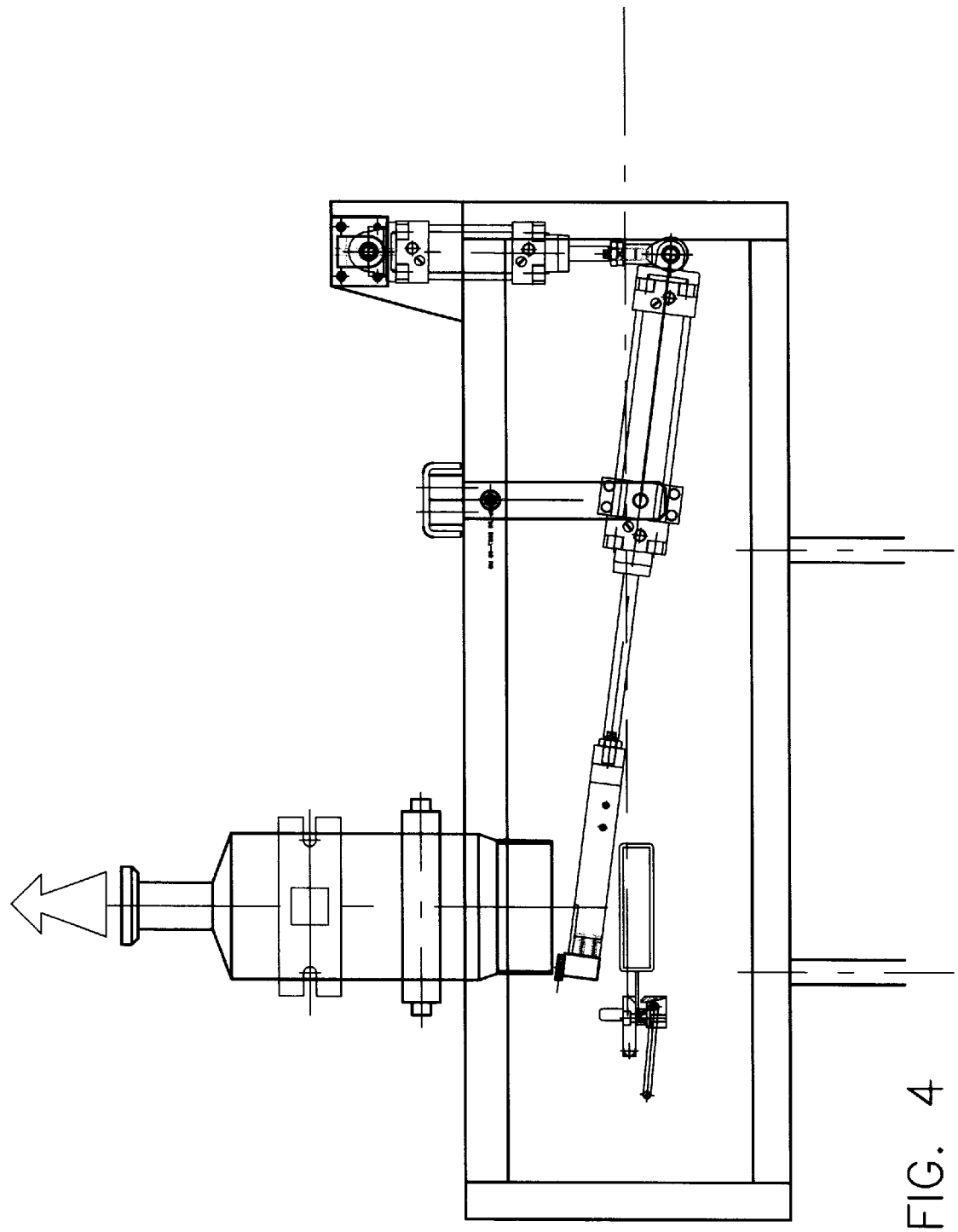
Figure 5:
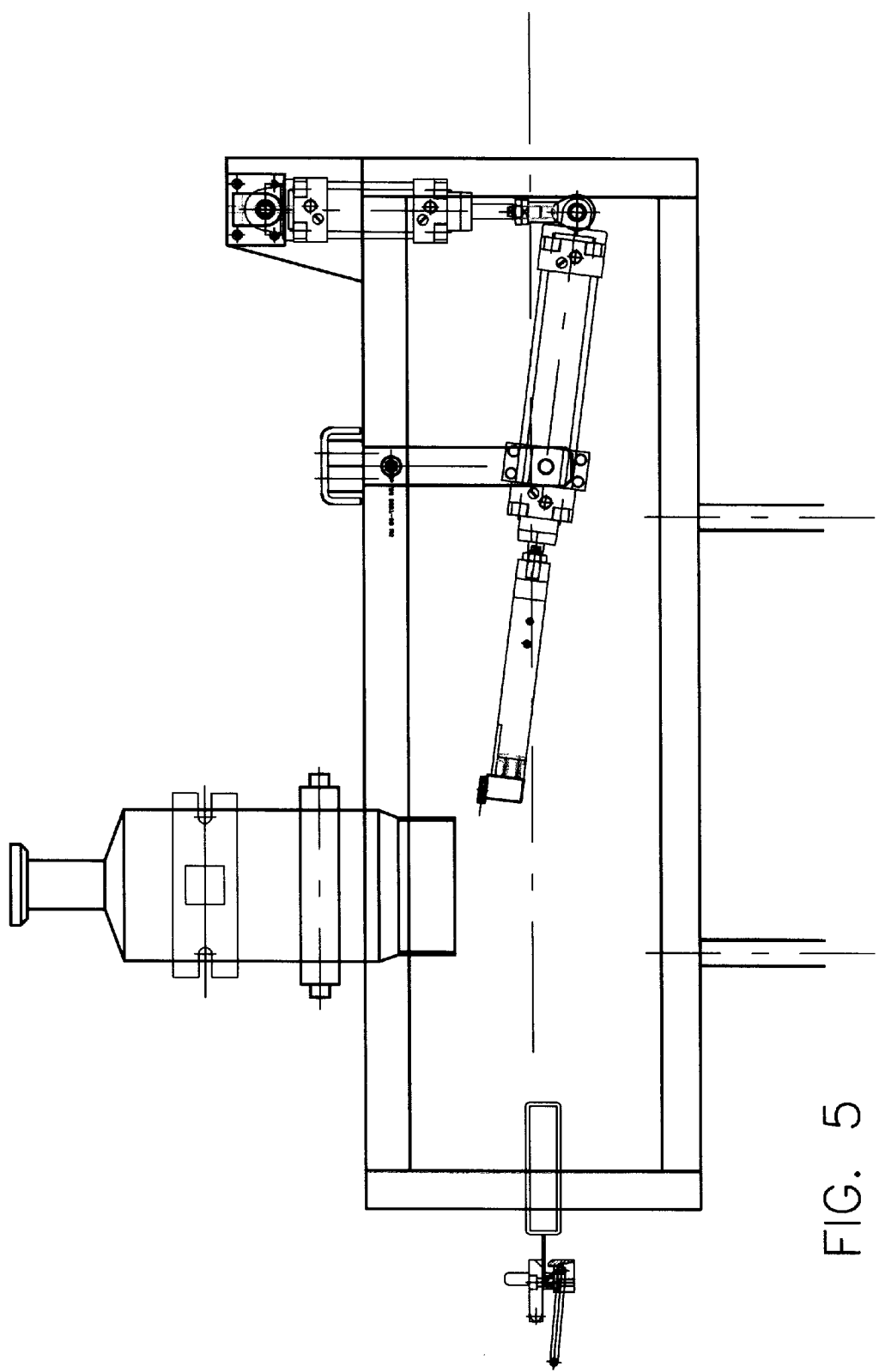

When the product emerges from the extrusion press, a cutting device 6 cuts the product and the device 7 inserts into the cut product a stick 8. The cutting device includes a bow 9 with a warmed thread (not shown) that cuts the product coming out from the extrusion press. The bow 9 is fitted on a piston 10, hinged on one side to a support 11 and on the other side to a second piston 12, that causes rotation of the bow 9 around support 11, in order to place the bow in an inclined position with reference to the extrusion press and to the cut product. The cutting cycle is shown in FIGS. 4 to 6.

Figure 1:
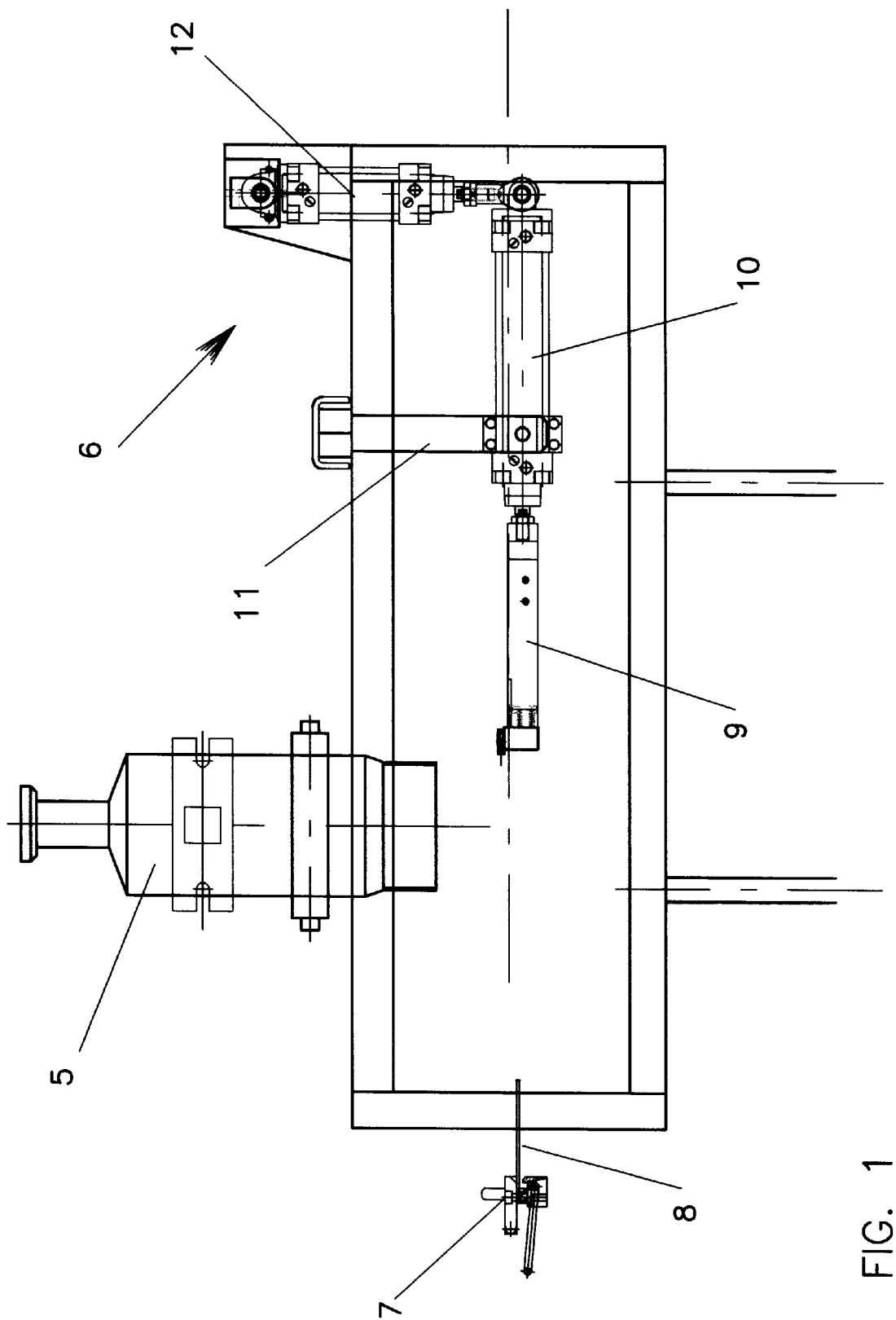
Figure 2:
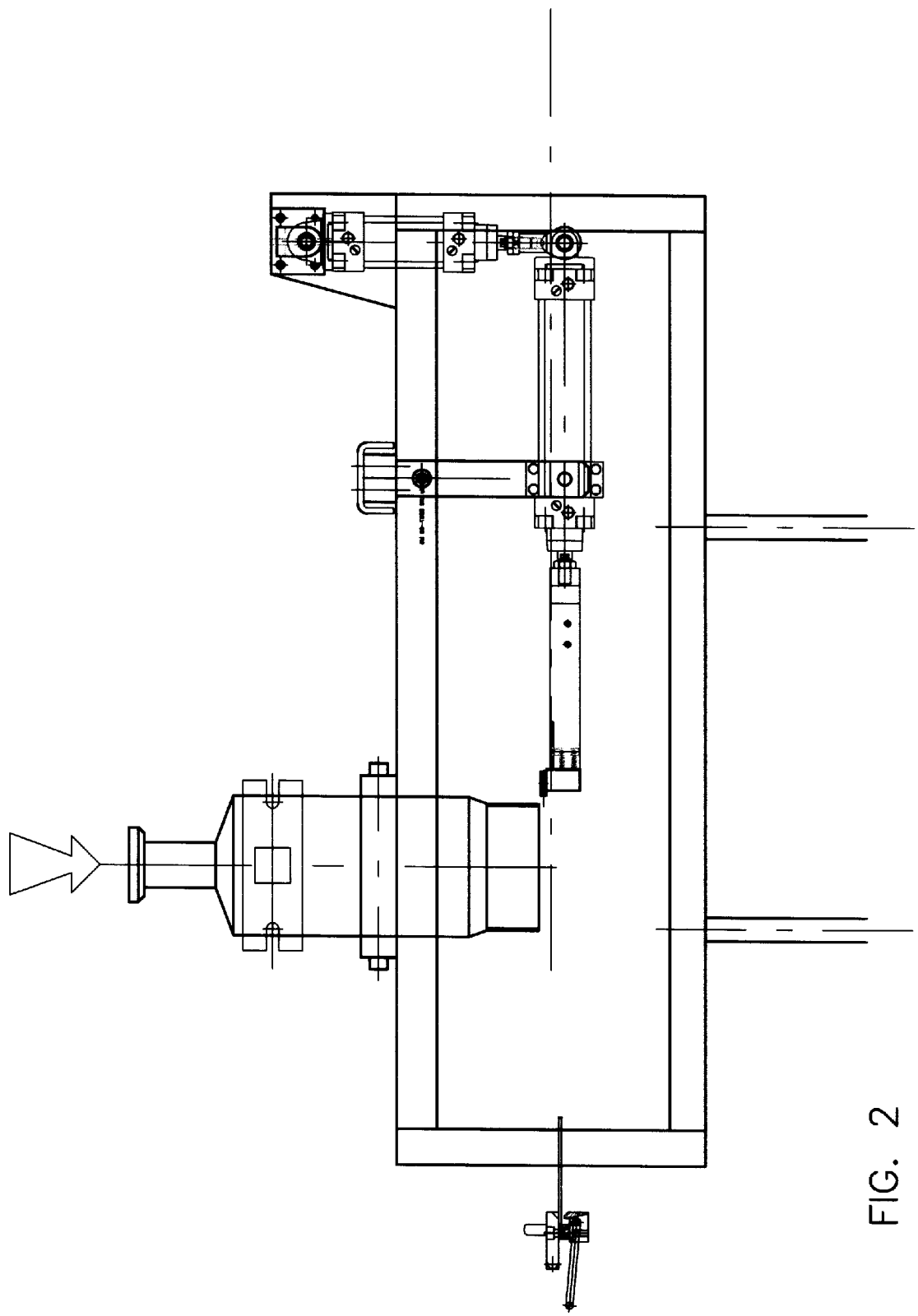
Figure 3:
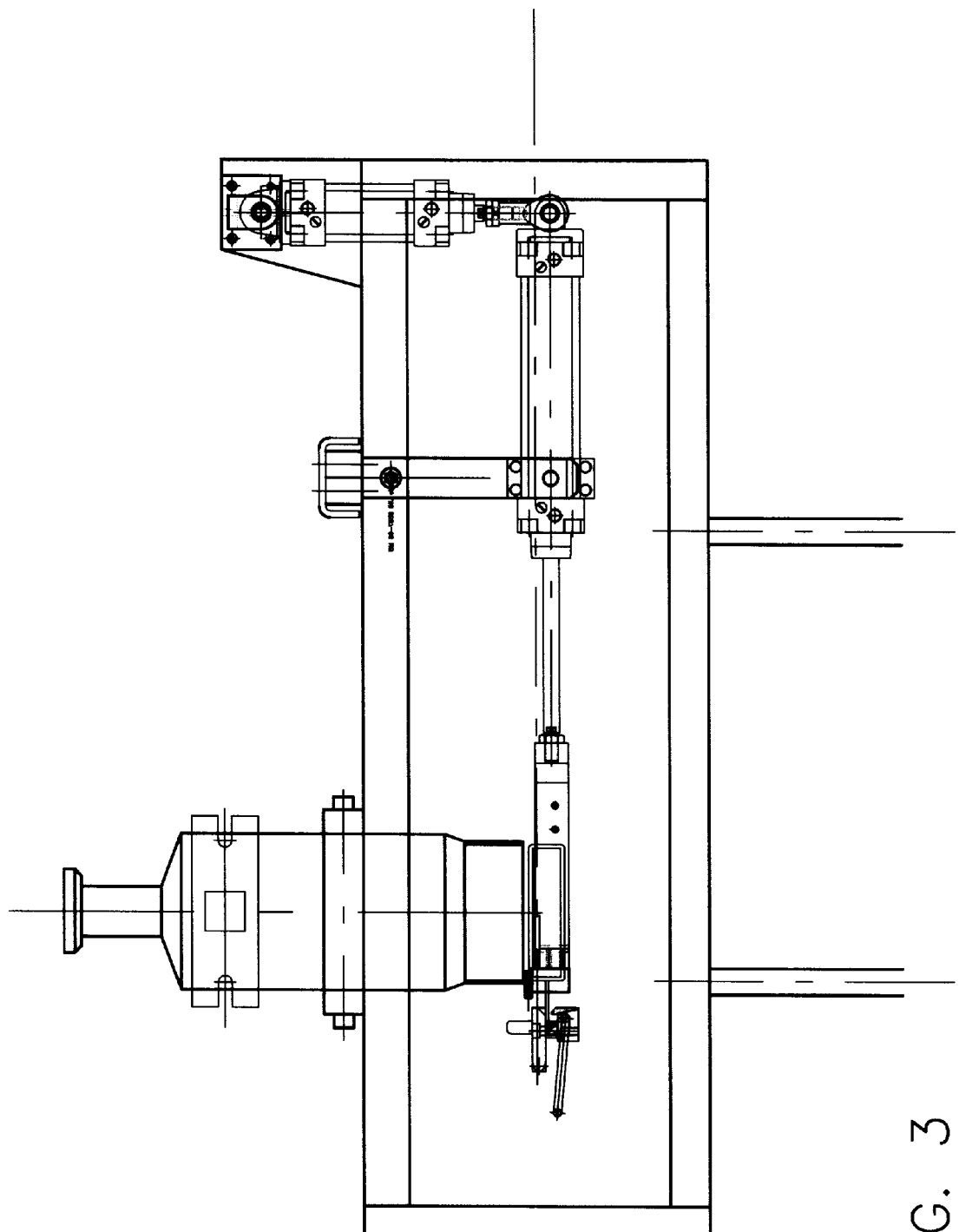

The extrusion press, after the product reaches the required temperature, goes forward until it reaches, with its front end, the cutting thread fitted on the bow 9 (FIG. 2). The bar of the product that comes out from the extrusion press is cut, while at the same time the inserter 7 is advanced for the insertion of a stick 8 into the bar of extruded product, while the warmed thread, that moves in contact with the entrance of the extrusion press, accomplishes the cutting operation.

At this point, the extrusion press steps back (FIG. 4) in order to avoid the product, that is still being extruded, from touching the warmed thread. At the same time, the piston 12 is operated in order to place the bow 9 in an inclined position, as shown in FIG. 4, so as to remove it from the cutting zone, acting on the piston 10, with the warmed thread touching the already cut product or product that is still being extruded. The bow goes to the position of FIG. 5, while the inserter 7 goes back and brings the end of the stick in correspondence with a conveyance device provided with grasping pliers of a known type, that takes the product.

At this point, the machine is in the position of FIG. 6 and starts a cutting cycle, while the already cut product, shown in FIG. 6 by number 13, goes to the final cooling step.

The cooling apparatus is shown in FIG. 7 and includes a conveyor substantially formed by a chain 14 fitted on a pair of wheels 15 and to which a plurality of pliers 16 are mounted that are suitable to receive, each of them, one or more sticks.

The sticks are inserted into the pliers by an apparatus 17 of a known type that is located immediately above the extrusion unit. The devices that insert the stick into the pliers, take the stick in order to insert it into the product, and place it again in the pliers. These devices are of a known type and are not described in detail.

According to the invention the product with the stick inserted is grasped by the pliers 16 and conveyed, by chain 14, in a cooling tunnel where it reaches the final required temperature. The tunnel includes a chamber 18 with appropriately insulated walls, inside which liquid nitrogen is sprayed through a plurality of nozzles 19. The liquid nitrogen, expelled in little drops, is dispersed in the environment by means of a plurality of ventilators 20. The use of liquid nitrogen considerably reduces the cooling period and therefore, with the same production capacity of the plant, reduces the dimensions of the plant.

At the exit of chamber 18 an apparatus 21 can be provided that is suitable to take the products already completely cooled and coat them with a further layer, for instance chocolate, grains or the like, and below this latter apparatus there is an extraction device that places the product in the packaging device 4. In this way, production in perfect hygienic conditions is realized with an apparatus that is ecologically advanced, as there is no contact between the product and the different parts that form the apparatus itself. The apparatus is also sound from an ecological point of view as no cooling gases that are noxious to the environment are used, removing in this way the risk of pollution. An expert could provide many variations and changes, that are included in the scope of the present invention.

I claim:

1. A method of producing an ice cream product with a stick, comprising the steps of:

cooling ice cream to a temperature sufficient to allow the ice cream to be supported by a stick;

inserting a stick into a holding means mounted on a conveying device;

conveying the stick to an extrusion press area;

extruding the ice cream;

cutting the extruded ice cream to form a bar of ice cream while inserting the stick into the bar of ice cream; and conveying the bar of ice cream by the stick while being held and supported by the holding means into and through a cooling chamber for cooling the bar of ice cream to a final temperature.

2. The method according to claim 1, wherein the temperature is between about −9° C. and −10° C.

3. The method according to claim 1, including cooling the ice cream bar during a second cooling step in the cooling chamber using liquid nitrogen.

4. The method according to claim 3, including spraying liquid nitrogen as droplets in the cooling chamber for cooling the ice cream bar during the second cooling step.

5. The method according to claim 1, including conveying the ice cream bar in the cooling chamber during the second cooling step along a closed path lying in a horizontal plane in the cooling chamber.

6. An apparatus for producing an ice cream product with a stick comprising:

means for cooling ice cream to a temperature sufficient to allow insertion of a stick;

means for holding the stick mounted on a conveyor device;

means for extruding the ice cream;

means for cutting the ice cream into a bar of ice cream;

means for inserting the stick into the bar of ice cream; and a cooling chamber for cooling the bar of ice cream to a final temperature.

7. The plant according to claim 6, wherein the means for inserting the stick into the ice cream bar acts at the same time as the means for cutting the ice cream bar.

8. The plant according to claim 6, wherein cooling means cools the ice cream to an initial temperature of between about −9° C. and −10° C.

9. The plant according to claim 6, including in the cooling chamber means for applying liquid nitrogen to the ice cream for cooling the ice cream.

10. The plant according to claim 9, wherein the means for applying liquid nitrogen acts for spraying liquid nitrogen as droplets in the cooling chamber for cooling the ice cream bar during the second cooling step.

11. The plant according to claim 6, wherein the conveying means moves the ice cream bar in the cooling chamber during a second cooling step along a closed path lying in a horizontal plane.

* * * * *